(12) United States Patent
Burky et al.

(10) Patent No.: US 9,489,207 B2
(45) Date of Patent: Nov. 8, 2016

(54) PROCESSOR AND METHOD FOR PARTIALLY FLUSHING A DISPATCHED INSTRUCTION GROUP INCLUDING A MISPREDICTED BRANCH

(75) Inventors: William E. Burky, Austin, TX (US); Brian R. Mestan, Austin, TX (US); Dung Q. Nguyen, Austin, TX (US); Balaram Sinharoy, Poughkeepsie, NY (US); Benjamin W. Stolt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2145 days.

(21) Appl. No.: 12/423,495

(22) Filed: Apr. 14, 2009

(65) Prior Publication Data
US 2010/0262807 A1    Oct. 14, 2010

(51) Int. Cl.
*G06F 9/30* (2006.01)
*G06F 9/38* (2006.01)

(52) U.S. Cl.
CPC ........... *G06F 9/3861* (2013.01); *G06F 9/3842* (2013.01); *G06F 9/3851* (2013.01); *G06F 9/3855* (2013.01); *G06F 9/3857* (2013.01)

(58) Field of Classification Search
CPC ... G06F 9/3842; G06F 9/3844; G06F 9/3861
See application file for complete search history.

(56) References Cited

U.S. PATENT DOCUMENTS

| | | | | |
|---|---|---|---|---|
| 5,850,533 | A * | 12/1998 | Panwar et al. | 712/216 |
| 6,553,480 | B1 * | 4/2003 | Cheong et al. | 712/23 |
| 6,738,897 | B1 * | 5/2004 | Talcott | 712/240 |
| 6,898,696 | B1 * | 5/2005 | Cheong et al. | 712/228 |
| 7,194,603 | B2 | 3/2007 | Burky et al. | |
| 8,099,586 | B2 * | 1/2012 | Chou et al. | 712/233 |
| 2006/0155966 | A1 | 7/2006 | Burky et al. | |
| 2007/0011516 | A1 | 1/2007 | Mack et al. | |
| 2008/0072018 | A1 * | 3/2008 | Le et al. | 712/217 |

OTHER PUBLICATIONS

Hennessy et al., "Computer Architecture—A Quantitative Approach", 2nd Edition, 1996, p. 105.*
CSE 471, "Computer Design and Organization—Branch Prediction", Winter 2000, pp. 1-3.*

* cited by examiner

*Primary Examiner* — David J Huisman
(74) *Attorney, Agent, or Firm* — Stephen R. Tkacs; Stephen J. Walder, Jr.; William J. Stock (57) ABSTRACT

Mechanisms are provided for partial flush handling with multiple branches per instruction group. The instruction fetch unit sorts instructions into groups. A group may include a floating branch instruction and a boundary branch instruction. For each group of instructions, the instruction sequencing unit creates an entry in a global completion table (GCT), which may also be referred to herein as a group completion table. The instruction sequencing unit uses the GCT to manage completion of instructions within each outstanding group. Because each group may include up to two branches, the instruction sequencing unit may dispatch instructions beyond the first branch, i.e. the floating branch. Therefore, if the floating branch results in a misprediction, the processor performs a partial flush of that group, as well as a flush of every group younger than that group.

16 Claims, 5 Drawing Sheets

PROCESSOR AND METHOD FOR PARTIALLY FLUSHING A DISPATCHED INSTRUCTION GROUP INCLUDING A MISPREDICTED BRANCH

This invention was made with United States Government support under Agreement No. HR 0011-07-9-0002 awarded by DARPA. The Government has certain rights in the invention.

BACKGROUND

The present application relates generally to an improved data processing apparatus and method and more specifically to an apparatus and method for partial flush handling with multiple branches per group.

Present-day high-speed processors include the capability of simultaneous execution of instructions, speculative execution and loading of instructions and simultaneous operation of various resources within a processor. In particular, it has been found desirable to manage execution of one or more threads within a processor, so that more than one execution thread may use the processor resources more effectively than they are typically used by a single thread.

Prior processor designs have dealt with the problem of managing multiple threads via a hardware state switch from execution of one thread to execution of another thread. Such processors are known as hardware multi-threaded (HMT) processors, and as such, can provide a hardware switch between execution of one or the other thread. An HMT processor overcomes the limitations of waiting on an idle thread by permitting the hardware to switch execution to a non-idle thread. Execution of both threads can be performed not simultaneously, but by allocating execution slices to each thread when neither is idle. However, the execution management and resource switching (e.g., register swap out) in an HMT processor introduce overhead that makes the processor less efficient than running on two single-threaded processors. In addition HMT does not allow threads to take full advantage of instruction parallelism by using multiple execution engines that are usually not all busy at the same time, since only one thread is executing at a given time.

Simultaneous multi-threaded (SMT) processors provide an even more efficient use of processor resources, as multiple threads may simultaneously use processor resources. Multiple threads execute concurrently in an SMT processor so that multiple processor execution units, such as floating point units, fixed point instruction units, load/store units, and others can perform tasks for one (or more, depending on the capabilities of the execution units) of multiple threads simultaneously. Storage and register resources may also be allocated on a per-thread basis so that the complete internal state switch of the HMT is avoided.

SUMMARY

In one illustrative embodiment, a method, in a data processing system, is provided for partial flush handling. The method comprises dispatching an instruction group to one or more execution units. The dispatched instruction group includes a plurality of instructions including a floating branch instruction. The method further comprises, responsive to the floating branch instruction resulting in a branch misprediction, sending flush information to one or more execution units. Responsive to the flush information, the one or more execution units flush any full instruction groups younger than the dispatched instruction group and any instructions within the dispatched instruction group that are younger than the floating branch instruction such that the one or more execution units perform a partial flush of the dispatched instruction group.

In another illustrative embodiment, a processor comprises an instruction fetch unit, an instruction sequencing unit, and one or more execution units. The instruction fetch unit fetches a plurality of instructions including a floating branch instruction and sorts the plurality of instructions into an instruction group. The instruction sequencing unit receives the instruction group, creates an entry for the instruction group in a group completion table, and dispatches the plurality of instructions to the one or more execution units. Responsive to the floating branch instruction resulting in a branch misprediction, the instruction sequencing unit sends flush information to the one or more execution units. Responsive to the flush information, the one or more execution units flush any full instruction groups younger than the dispatched instruction group and any instructions within the dispatched instruction group that are younger than the floating branch instruction.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for partial flush handling with multiple branches per instruction group. The instruction fetch unit sorts instructions into groups. In accordance with the illustrative embodiments, a group may include a floating branch instruction and a boundary branch instruction. For each group of instructions, the instruction sequencing unit creates an entry in a global completion table (GCT), which may also be referred to herein as a group completion table. The instruction sequencing unit uses the GCT to manage completion of instructions within each outstanding group.

Because each group may include up to two branches, the instruction sequencing unit may dispatch instructions beyond the first branch, i.e. the floating branch. Therefore, if the floating branch results in a misprediction, the processor must perform a partial flush of that group, as well as a flush of every group younger than that group.

Figure 1:
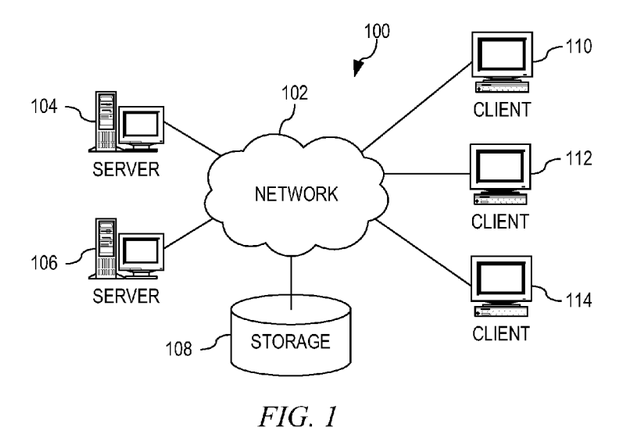
FIG. 1 depicts a pictorial representation of an example distributed data processing system in which aspects of the illustrative embodiments may be implemented.
Figure 2:
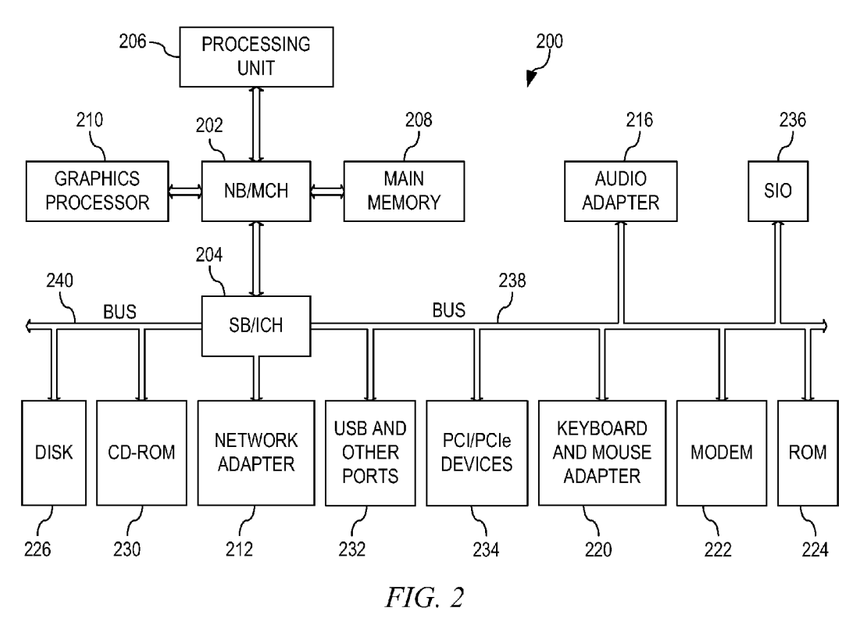
FIG. 2 shows a block diagram of an example data processing system in which aspects of the illustrative embodiments may be implemented.
Figure 3:
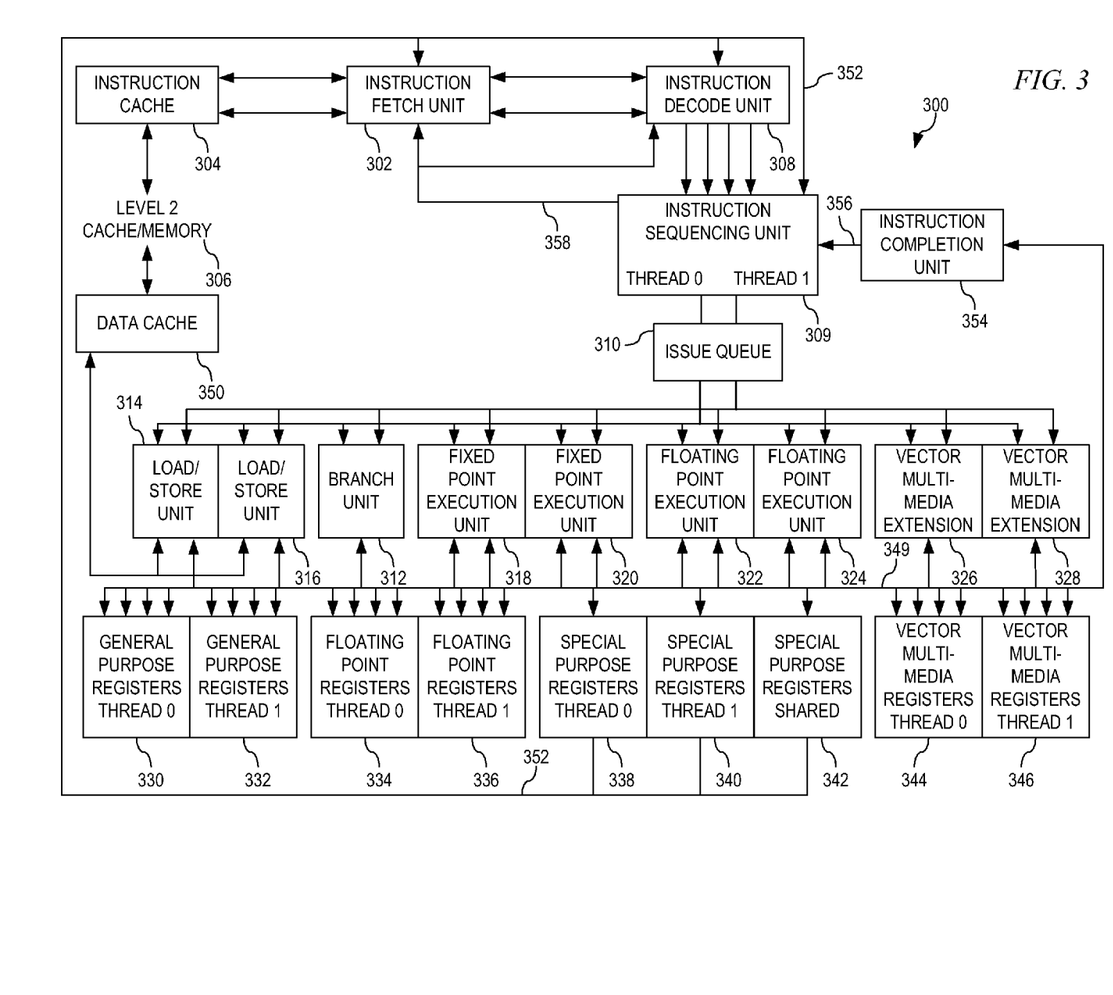
FIG. 3 depicts an exemplary block diagram of a conventional dual threaded processor design showing functional units and registers in accordance with an illustrative embodiment.

The illustrative embodiments may be utilized in many different types of data processing environments including a distributed data processing environment, a single data processing device, or the like. In order to provide a context for the description of the specific elements and functionality of the illustrative embodiments, FIGS. 1-3 are provided hereafter as example environments in which aspects of the illustrative embodiments may be implemented. While the description following FIGS. 1-3 will focus primarily on a single data processing device implementation, this is only an example and is not intended to state or imply any limitation with regard to the features of the present invention. To the contrary, the illustrative embodiments are intended to include distributed data processing environments and embodiments.

With reference now to the figures and in particular with reference to FIGS. 1-3, example diagrams of data processing environments are provided in which illustrative embodiments of the present invention may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring to FIG. 3, an exemplary block diagram of a conventional dual threaded processor design showing functional units and registers is depicted in accordance with an illustrative embodiment. Processor 300 may be implemented as processing unit 206 in FIG. 2 in these illustrative examples. Processor 300 comprises a single integrated circuit superscalar microprocessor with dual-thread simultaneous multi-threading (SMT) that may also be operated in a single threaded mode. While dual-threaded SMT is shown in FIG. 3, processor 300 may simultaneously process more or fewer threads. For example, processor 300 may be a quad-thread SMT processor. Accordingly, as discussed further herein below, processor 300 includes various units, registers, buffers, memories, and other sections, all of which are formed by integrated circuitry. Also, in one example embodiment, processor 300 operates according to reduced instruction set computer (RISC) techniques.

As shown in FIG. 3, instruction fetch unit (IFU) 302 connects to instruction cache 304. Instruction cache 304 holds instructions for multiple programs (threads) to be executed. Instruction cache 304 also has an interface to level 2 (L2) cache/memory 306. IFU 302 requests instructions from instruction cache 304 according to an instruction address, and passes instructions to instruction decode unit 308. In an illustrative embodiment, IFU 302 may request multiple instructions from instruction cache 304 for up to two threads at the same time. Instruction decode unit 308 decodes multiple instructions for up to two threads at the same time and passes decoded instructions to instruction sequencing unit (ISU) 309.

Processor 300 may also include issue queue 310, which receives decoded instructions from ISU 309. Instructions are stored in the issue queue 310 while awaiting dispatch to the appropriate execution units. In an illustrative embodiment, the execution units of the processor may include branch unit 312, load/store units (LSUA) 314 and (LSUB) 316, fixed point execution units (FXUA) 318 and (FXUB) 320, floating point execution units (FPUA) 322 and (FPUB) 324, and vector multimedia extension units (VMXA) 326 and (VMXB) 328. In one embodiment, the floating point execution units 322, 324 may be combined with the vector multimedia extension units 326, 328. Execution units 312, 314, 316, 318, 320, 322, 324, 326, and 328 are fully shared across both threads, meaning that execution units 312, 314, 316, 318, 320, 322, 324, 326, and 328 may receive instructions from either or both threads. The processor includes multiple register sets 330, 332, 334, 336, 338, 340, 342, 344, and 346, which may also be referred to as architected register files (ARFs).

An ARF is a file where completed data is stored once an instruction has completed execution. ARFs 330, 332, 334, 336, 338, 340, 342, 344, and 346 may store data separately for each of the two threads and by the type of instruction, namely general purpose registers (GPRs) 330 and 332, floating point registers (FPRs) 334 and 336, special purpose registers (SPRs) 338 and 340, and vector registers (VRs) 344 and 346. Separately storing completed data by type and by thread assists in reducing processor contention while processing instructions.

The processor additionally includes a set of shared special purpose registers (SPR) 342 for holding program states, such as an instruction pointer, stack pointer, or processor status word, which may be used on instructions from either or both threads. Execution units 312, 314, 316, 318, 320, 322, 324, 326, and 328 are connected to ARFs 330, 332, 334, 336, 338, 340, 342, 344, and 346 through simplified internal bus structure 349.

In order to execute a floating point instruction, FPUA 322 and FPUB 324 retrieves register source operand information, which is input data required to execute an instruction, from FPRs 334 and 336, if the instruction data required to execute the instruction is complete or if the data has passed the point of flushing in the pipeline. Complete data is data that has been generated by an execution unit once an instruction has completed execution and is stored in an ARF, such as ARFs 330, 332, 334, 336, 338, 340, 342, 344, and 346. Incomplete data is data that has been generated during instruction execution where the instruction has not completed execution. FPUA 322 and FPUB 324 input their data according to which thread each executing instruction belongs to. For example, FPUA 322 inputs completed data to FPR 334 and FPUB 324 inputs completed data to FPR 336, because FPUA 322, FPUB 324, and FPRs 334 and 336 are thread specific.

During execution of an instruction, FPUA 322 and FPUB 324 output their destination register operand data, or instruction data generated during execution of the instruction, to FPRs 334 and 336 when the instruction has passed the point of flushing in the pipeline. During execution of an instruction, FXUA 318, FXUB 320, LSUA 314, and LSUB 316 output their destination register operand data, or instruction data generated during execution of the instruction, to GPRs 330 and 332 when the instruction has passed the point of flushing in the pipeline. During execution of a subset of instructions, FXUA 318, FXUB 320, and branch unit 312 output their destination register operand data to SPRs 338, 340, and 342 when the instruction has passed the point of flushing in the pipeline. Program states, such as an instruction pointer, stack pointer, or processor status word, stored in SPRs 338 and 340 indicate thread priority 352 to ISU 309. During execution of an instruction, VMXA 326 and VMXB 328 output their destination register operand data to VRs 344 and 346 when the instruction has passed the point of flushing in the pipeline.

Data cache 350 may also have associated with it a non-cacheable unit (not shown) which accepts data from the processor and writes it directly to level 2 cache/memory 306. In this way, the non-cacheable unit bypasses the coherency protocols required for storage to cache.

In response to the instructions input from instruction cache 304 and decoded by instruction decode unit 308, ISU 309 selectively dispatches the instructions to issue queue 310 and then onto execution units 312, 314, 316, 318, 320, 322, 324, 326, and 328 with regard to instruction type and thread. In turn, execution units 312, 314, 316, 318, 320, 322, 324, 326, and 328 execute one or more instructions of a particular class or type of instructions. For example, FXUA 318 and FXUB 320 execute fixed point mathematical operations on register source operands, such as addition, subtraction, ANDing, ORing and XORing. FPUA 322 and FPUB 324 execute floating point mathematical operations on register source operands, such as floating point multiplication and division. LSUA 314 and LSUB 316 execute load and store instructions, which move operand data between data cache 350 and ARFs 330, 332, 334, and 336. VMXA 326 and VMXB 328 execute single instruction operations that include multiple data. Branch unit 312 executes branch instructions which conditionally alter the flow of execution through a program by modifying the instruction address used by IFU 302 to request instructions from instruction cache 304.

Instruction completion unit 354 monitors internal bus structure 349 to determine when instructions executing in execution units 312, 314, 316, 318, 320, 322, 324, 326, and 328 are finished writing their operand results to ARFs 330, 332, 334, 336, 338, 340, 342, 344, and 346. Instructions executed by branch unit 312, FXUA 318, FXUB 320, LSUA 314, and LSUB 316 require the same number of cycles to execute, while instructions executed by FPUA 322, FPUB 324, VMXA 326, and VMXB 328 require a variable, and a larger number of cycles to execute. Therefore, instructions that are grouped together and start executing at the same time do not necessarily finish executing at the same time. An instruction is said to "finish" when one of the execution units 312, 314, 316, 318, 320, 322, 324, 326, or 328 is done executing the instruction and reports back to ISU 309. An instruction is said to "complete" when the instruction is finishing executing in one of execution units 312, 314, 316, 318, 320, 322, 324, 326, or 328, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 354 monitors for the completion of instructions, and sends control information 356 to ISU 309 to notify ISU 309 that more groups of instructions can be dispatched to execution units 312, 314, 316, 318, 320, 322, 324, 326, and 328. ISU 309 sends dispatch signal 358, which serves as a throttle to bring more instructions down the pipeline to the dispatch unit, to IFU 302 and instruction decode unit 308 to indicate that it is ready to receive more decoded instructions.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the SMP system mentioned previously, without departing from the spirit and scope of the present invention.

Figure 4A:
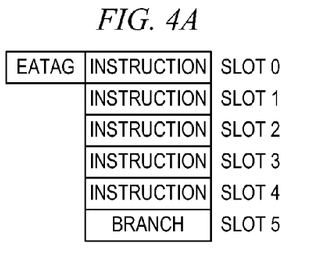
FIGS. 4A and 4B illustrate groups of instructions in accordance with an illustrative embodiment.
Figure 4B:
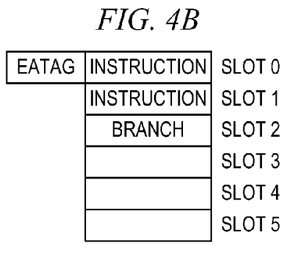

In one illustrative embodiment, IFU 302 may sort instructions into groups to be dispatched by ISU 309 which can greatly reduce the overhead and complexity of tracking individual instructions throughout the machine. FIGS. 4A and 4B illustrate groups of instructions in accordance with an illustrative embodiment. More particularly, FIG. 4A depicts an example of a group of instructions that IFU 302 may provide to ISU 309. In the depicted example, a group may include six instructions, although a person of ordinary skill in the art will recognize that a group may include more or fewer instructions depending upon the implementation. IFU 302 places instructions in slot 0 through slot 4 and preferably places a branch instruction in slot 5.

IFU 302 provides an effective address tag (EAtag) for the first instruction in the group in addition to a count of the instructions in the group. ISU 309 does not use EAtags to determine relative ages. ISU 309 uses group tags (gtags) to track age. Within a group, instructions are always in-order. IFU 302 maintains a table (not shown) that associates an EAtag with a longer effective address (EA) for each instruction, because referring to each instruction by its full effective address throughout the processor design results in an imposing and unnecessary complexity. The combination of EAtag and instruction count allows both the oldest and youngest instruction in the group to be identified by EAtag. The youngest instruction is reported back to IFU 302 at completion time to allow the architected EA pointers to advance. The oldest instruction is reported to the IFU 302 at flush time to indicate at which EA the IFU 302 needs to start refetching instructions. The EA table and the manner in which EAtags are formed is described in co-pending patent application entitled "Tracking Effective Addresses in an Out-of-Order Processor," which is herein incorporated by reference.

ISU 309 may manage a predetermined number of groups. For example, in one example embodiment, ISU 309 may have twenty groups outstanding, although a person of ordinary skill in the art will recognize that the ISU may manage more or fewer groups depending upon the implementation. ISU 309 may manage groups using a global completion table (GCT), also referred to herein as a group completion table.

ISU 309 may then dispatch the entire group as a whole and the group may complete as a whole. The branch instruction is a boundary for the group. The possibility exists for a flush condition to occur for any of the instructions in slot 0 through slot 5. For example, the instruction in slot 2 may be a load instruction that results in a cache miss or a timeout condition. In this example, the processor may flush the whole group and any younger groups.

A branch misprediction is one example of a flush condition. While the processor may use sophisticated logic to predict branches and speculatively fetch and dispatch subsequent instructions, branch mispredictions do occur and are relatively common flush conditions. In the examples shown in FIGS. 4A and 4B, IFU 302 uses a branch instruction as a group boundary. Thus, the branch instruction is the youngest instruction in each group. Because only instructions younger than a branch are affected by a misprediction, when a branch misprediction occurs, the processor need not flush that group; rather, the processor flushes any younger full group.

ISU 309 may perform a flush by providing a group mask (gmask) to each of the execution units. The gmask consists of one bit for each possible group and indicates which of the groups are to be flushed. Each execution unit 314, 316, 312, 318, 320, 322, 324, 326, 328 uses the gmask to determine which instructions to flush. In one embodiment, ISU 309 provides a group tag (gtag) with each instruction when dispatched to the execution units. The gtag identifies the group to which the instruction belongs. The execution units then determine whether to flush each instruction based on its gtag and the gmask.

IFU 302 attempts to fill each group as much as possible while still ending each group with a branch instruction. However, it is not always possible to fill a group. In the example shown in FIG. 4B, IFU 302 places a branch instruction in slot 2, meaning slot 3 through slot 5 are empty, because the group ends with the branch instruction, which is the boundary for the group. When branch instructions are more frequent within the program code, the number of incomplete groups becomes greater, which reduces the effectiveness of grouping the instructions.

Figure 5A:
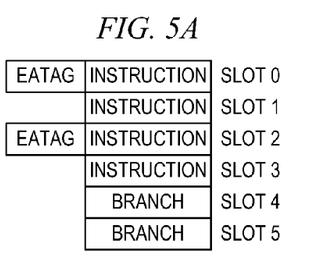
FIGS. 5A and 5B illustrate groups of instructions with multiple branches in accordance with an illustrative embodiment.
Figure 5B:
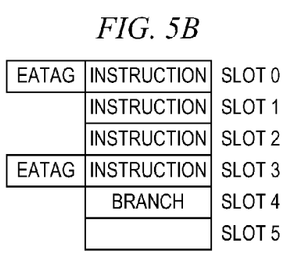

In accordance with an illustrative embodiment, IFU 302 may provide two branches within a group. FIGS. 5A and 5B illustrate groups of instructions with multiple branches in accordance with an illustrative embodiment. More particularly, in the example depicted in FIG. 5A, IFU 302 places a "floating" branch instruction in slot 4. The floating branch instruction may occur anywhere age-wise within the group, but in this example it is placed in slot 4. ISU 309 will expect a floating branch instruction in slot 4 of each group. IFU 302 may go beyond this floating branch and place other instructions in the remaining slots, including another branch, which IFU 302 places in slot 5. The branch instruction in slot 5 is a boundary branch instruction, as in the examples in FIGS. 4A and 4B. That is, the group ends on a boundary branch instruction.

In the example depicted in FIG. 5A, IFU 302 places instructions in slot 0 and slot 1 and then encounters a branch instruction. IFU 302 then places the branch instruction in slot 4 as the floating branch. Branch prediction algorithms and logic are known in the art and are not the focus of this disclosure. Using branch prediction, IFU 302 fetches subsequent instructions for speculative execution and places these instructions in slot 2 and slot 3. IFU 302 then encounters another branch and places this branch in slot 5 as the boundary branch. IFU 302 provides an EAtag for the first instruction (slot 0), the number of instructions in the group up to and including the floating branch, the first instruction after the floating branch (slot 2 in this example), and the number of instructions after the floating branch. IFU 302 may also provide an age indication to inform ISU 309 of the age of the floating branch relative to other instructions in the group.

If IFU 302 does not encounter another branch, then IFU 302 may leave slot 5 empty. Thus, not every group will have a boundary branch. FIG. 5B depicts a group with a floating branch and no boundary branch. IFU 302 provides an EAtag for the first instruction (slot 0) and the first instruction after the floating branch (slot 3 in this example). If IFU 302 does not encounter a branch instruction within the first four instructions in this example, then IFU 302 may simply fill slot 0 through slot 3 and leave slot 4 and slot 5 empty. If two branches occur very close to one another (e.g., add, branch, add, branch), then IFU 302 would put the first add in slot 0, the first branch in slot 4, the second add in slot 1, and the second branch in slot 5. This would leave slot 2 and slot 3 empty.

Allowing IFU 302 to place more than one branch in a group may cause additional complication. For example, if the floating branch results in a branch misprediction, hence a flush condition, the processor may have one or more instructions before the floating branch within the group and one or more instructions after the branch within the group outstanding. Flushing the whole group results in all of the instructions, including the floating branch, to be re-dispatched and re-executed, which could result in another misprediction. Thus, in accordance with one illustrative embodiment, a mechanism is provided for managing a partial group flush with multiple branches allowed per group.

Figure 6:
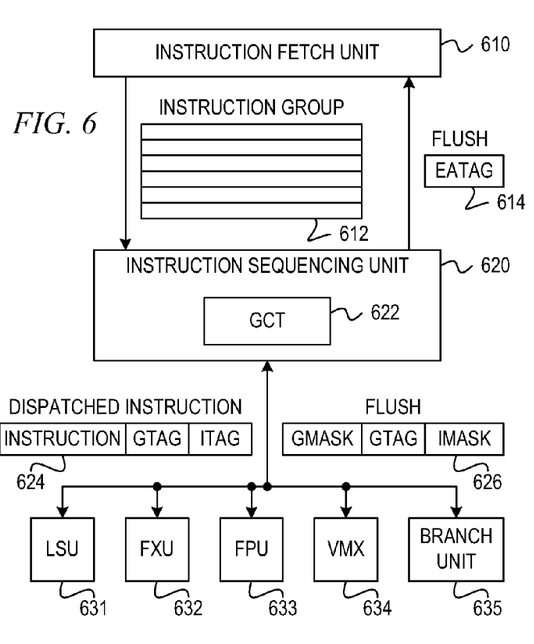
FIG. 6 is a block diagram of a processor with partial flush handling in accordance with an illustrative embodiment.

FIG. 6 is a block diagram of a processor with partial flush handling in accordance with an illustrative embodiment. Instruction fetch unit (IFU) 610 fetches instructions and sorts them into groups. As described above, IFU 610 may place up to two branch instructions in each group. IFU 610 provides each instruction group, such as instruction group 612, to instruction sequencing unit (ISU) 620. ISU 620 creates an entry for group 612 in global completion table (GCT) 622, which may also be referred to herein as a group completion table. GCT 622 may store information in each entry for managing dispatching, completion, and flushing of the instructions in the corresponding group.

Figure 7:
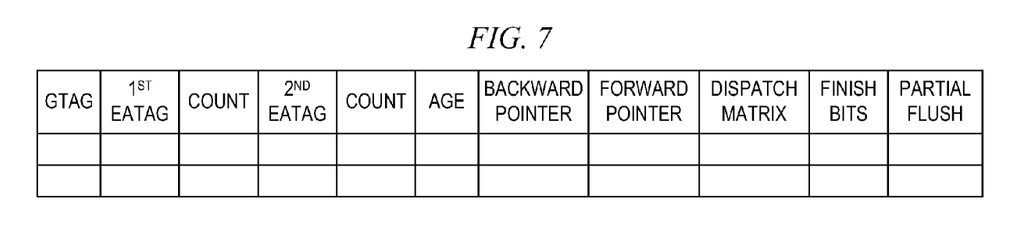
FIG. 7 depicts an example group completion table in accordance with an illustrative embodiment.

FIG. 7 depicts an example group completion table in accordance with an illustrative embodiment. In the example depicted in FIG. 7, each group entry in the GCT includes a group tag (gtag) identifying the group. Each group entry also includes an EAtag of the first instruction in the group and a count of instructions after the first instruction until the floating branch. Because the instructions after the floating branch are speculative instructions based on a branch prediction, each group entry may also include an EAtag of the instruction after the floating branch and a count of instructions after the floating branch until the end of the group.

The GCT may also include a floating branch age field for tracking the age of the floating branch relative to the other instructions in the group. Because the first branch in the group is floating, an age indication may be stored in order to be able to easily determine the age of the floating branch relative to other instructions in the group. Using EAtags to determine the age of the floating branch may not be reliable, because there is not always a 1:1 correspondence of EAtags to instructions. In order to track the ages of groups relative to each other, each group entry may include a backward pointer that references a previous group and a forward pointer that references a next group. Thus, with the backward and forward pointers, the GCT is a linked list. Each group entry may also include a dispatch matrix that tracks which groups were already dispatched at the time of dispatching the current group. The processor may use this matrix to quickly determine what groups are younger than a flushing group. The ISU may perform some book keeping to keep these items up-to-date as groups are dispatched, flushed and completed.

Each group entry may also include finish bits, which may include one bit for each instruction in the group. The ISU may initiate the finish bits to all logical zeros, for example, and as each instruction completes, the ISU may turn its bit to a logical one. When all of the finish bits for a group are logical ones, the ISU may determine that the group has completed execution.

Each group entry may also include a partial flush bit. The ISU may use the partial flush bit to track whether a group experienced a partial flush. This is required at completion time to determine which instruction in the group is the youngest and which EAtag is sent to the IFU. If there was no partial flush, the ISU may send the EAtag of the last instruction in the group (second EAtag plus the number of instructions after the floating branch). If there was a partial flush, then the ISU may send the EAtag of the floating branch (first EAtag plus the number of instructions up to and including the floating branch).

EAtags on flushes indicate to the IFU from where to refetch. EAtags on completion indicate to where the architected state has advanced. In both cases, a partial flush influences the EAtag that is sent back to the IFU. For a flush, the ISU selects between the first EAtag (full group) and the first EAtag after the branch (partial). For completions, the ISU selects between the last EAtag (no partial flush) and the EAtag of the floating point branch (partial flush), as described above. The latter case may be referred to as a partial completion.

Returning to FIG. 6, ISU 620 dispatches instructions to execution units, which may include load/store unit (LSU) 631, fixed point execution unit (FXU) 632, floating point execution unit 633, vector multimedia extension (VMX) unit 634, and branch unit 635. A person of ordinary skill in the art will recognize that the processor may include more or fewer execution units depending upon the implementation. As an example, dispatched instruction 624 includes the instruction, the gtag of the group to which the instruction belongs, and an instruction tag (itag). The itag indicates an age-wise location within the group of the instruction. Each execution unit 631-635 may have within its pipeline instructions from multiple groups and different locations within the groups.

When each execution unit 631-635 finishes an instruction, the execution unit provides finish information (not shown) back to ISU 620, which manages completed instructions within GCT 622. If a branch misprediction occurs within branch unit 635, branch unit 635 informs ISU 620 of the branch misprediction, which ISU 620 treats as a flush condition. ISU 620 then must inform the rest of the processor, including IFU 610, execution units 631-635, rename mechanism (not shown), issue queues (not shown), etc. of the flush and which instructions are to be flushed.

If a branch misprediction results from a boundary branch, then the processor performs a full group flush. ISU 620 may determine that the branch instruction is a boundary branch based on the gtag and itag of the instruction. In this case, ISU 620 calculates an EAtag 614 for the oldest flushing instruction, which is the first instruction in the group after the boundary flush. ISU 620 may calculate this EAtag using the forward pointer of the mispredicted gtag to determine the next youngest group and looking up the stored EAtag of the first instruction in that group. IFU 610 may then re-fetch any instructions that are younger than the instruction corresponding to EAtag 614. On a flush, the execution unit provides the EAtag of the oldest flushed instruction to the IFU. Using the youngest completed is not possible because the flush may be caused by a group that is not yet eligible for completion.

Also, for a full group flush, ISU 620 provides a group mask (gmask) to execution units 631-635. The gmask indicates which full groups are to be flushed from execution units 631-635. The gmask may have a bit for each group. Thus, if ISU 620 manages up to twenty groups, then the gmask will be twenty bits. Execution units 631-635 then flush any instructions belonging to groups that are younger than the branch causing the misprediction based on the gtag of each instruction and the gmask.

If a branch misprediction results from a floating branch, then the processor performs a partial group flush. ISU 620 may determine that the branch instruction is a floating branch based on the gtag and itag of the instruction. For a partial group flush, ISU 620 provides partial flush information 626 including a group mask (gmask), the gtag of the floating branch, and an instruction mask (imask) to execution units 631-635. The gmask indicates which full groups are to be flushed from execution units 631-635. The imask indicates which instructions within the group corresponding to the gtag are to be flushed and is generated using the age information stored in the GCT entry. Execution units 631-635 then flush any instructions belonging to groups that are younger than the branch causing the misprediction based on the gtag of each instruction and the gmask. Execution units 631-635 then applies the gtag and imask to perform a partial group flush.

ISU 620 may then use the imask to mark flushed instructions as finished in the finish bits of a partially flushed group. For finished instructions, the finish bits have a logical one to indicate that the instructions have completed execution. ISU 620 forces the flushed instructions into a finished state by turning each finish bit corresponding to a one bit in the imask to a logical one. ISU 620 may also set a partial flush bit in the GCT in order to record the group that was partially flushed. This indication is needed when the group completes as it will cause the EAtag of the floating branch (now the youngest instruction in the group) to be sent to IFU 610 instead of the EAtag of the last instruction in the group.

In the case of a partial group flush, ISU 620 calculates an EAtag 614 for the oldest flushing instruction, which is the first instruction in the group after the floating branch. This EAtag was previously sent to ISU 620 from IFU 610 as part of the dispatched group.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
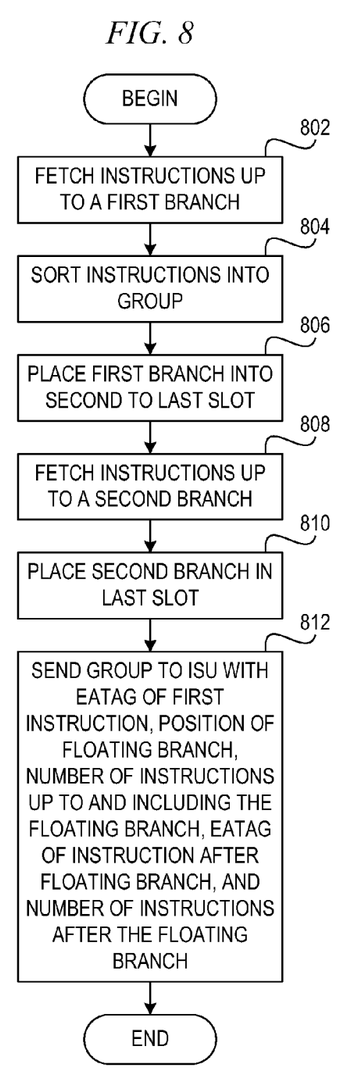
FIG. 8 is a flowchart illustrating operation of an instruction fetch unit for providing an instruction group with multiple branch instructions in accordance with an illustrative embodiment.

FIG. 8 is a flowchart illustrating operation of an instruction fetch unit for providing an instruction group with multiple branch instructions in accordance with an illustrative embodiment. Operation begins, and the instruction fetch unit (IFU) fetches instructions up to a first branch (block 802). The IFU sorts the instructions into a group (block 804). The IFU then places the first branch into a second to last slot, as a floating branch, in the instruction group (block 806).

The IFU may then fetch speculative instructions past the first (floating) branch up to a second branch (block 808). The IFU then places the second branch, if any, into the last slot in the instruction group (810). If a second branch is encountered and placed in the last slot, then this second branch is a boundary for the group and is referred to as a boundary branch. The IFU sends the group to the instruction sequencing unit (ISU) with the effective address tag (EAtag) of the first instruction, the position of the floating branch, the number of instructions up to and including the floating branch, the EAtag of the instruction after the floating branch, and the number of instructions in the group after the floating branch (block 812). Thereafter, operation ends.

Figure 9:
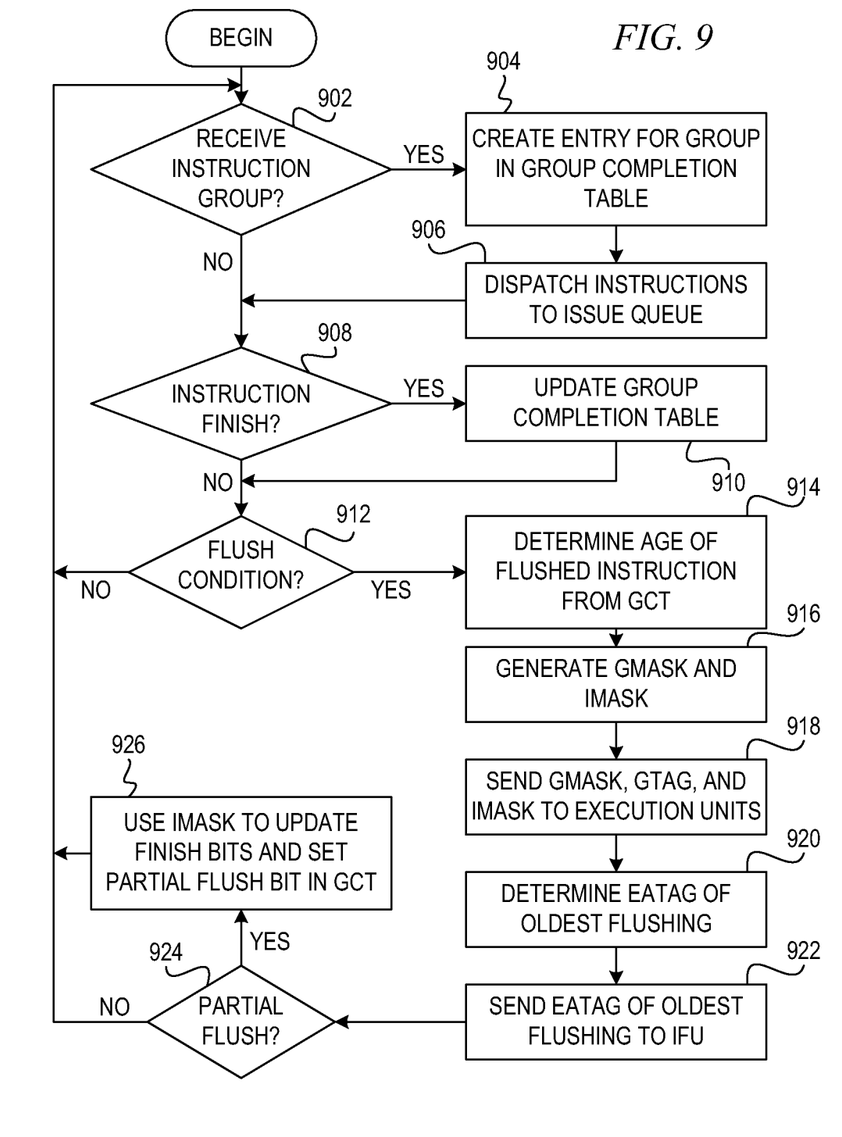
FIG. 9 is a flowchart illustrating operation of an instruction sequencing unit for handling partial group flush with multiple branches per instruction group in accordance with an illustrative embodiment.

FIG. 9 is a flowchart illustrating operation of an instruction sequencing unit for handling partial group flush with multiple branches per instruction group in accordance with an illustrative embodiment. Operation begins, and the instruction sequencing unit (ISU) determines whether an instruction group is received from the instruction fetch unit (IFU) (block 902). If the ISU determines that an instruction group is received, then the ISU creates an entry for the group in the group completion table (GCT) (block 904), and dispatches the instructions in the group to the issue queues, which in turn will issue them to the execution units (block 906). Then, the ISU determines whether an instruction has finished execution (block 908). If the ISU does not receive an instruction group in block 902, then operation proceeds to block 908 where the ISU determines whether an instruction has finished execution.

When the ISU determines that an instruction has finished execution in block 908, the ISU updates the associated finish bits in GCT (block 910) and determines whether a flush condition exists (block 912). If the ISU does not determine that an instruction has finished execution in block 908, then operation proceeds to block 912 to determine whether a flush condition exists.

If a flush condition does not exist in block 912, then operation returns to block 902 to determine whether the ISU receives an instruction group from the IFU. If a flush condition exists, the ISU determines an age of the flushed instruction from the GCT (block 914). If the flushed instruction is a branch, then determining the age includes determining if the branch is the floating branch (using an itag sent from the execution unit) and the age of that branch relative to other instructions in the group (using the floating branch age field). The ISU generates a group mask (gmask) and instruction mask (imask) based on the age of the failing instruction (block 916). The ISU sends the gmask, the gtag of the group with the failing instruction, and the imask to the execution units (block 918). The ISU determines the EAtag of the oldest flushing instruction (block 920) and sends the EAtag of the oldest flushing instruction to the IFU (block 922). The ISU then checks if the flush included a partial group flush (block 924). If a partial group was flushed, the ISU then uses the imask to update the finish bits in the GCT and sets the partial flush bit in the GCT (block 926). Thereafter, operation returns to block 902 to determine whether the ISU receives an instruction group from the IFU. If the ISU did not determine that a partial group flush took place in block 924, operation returns to block 902 to determine whether the ISU receives an instruction group from the IFU.

Figure 10:
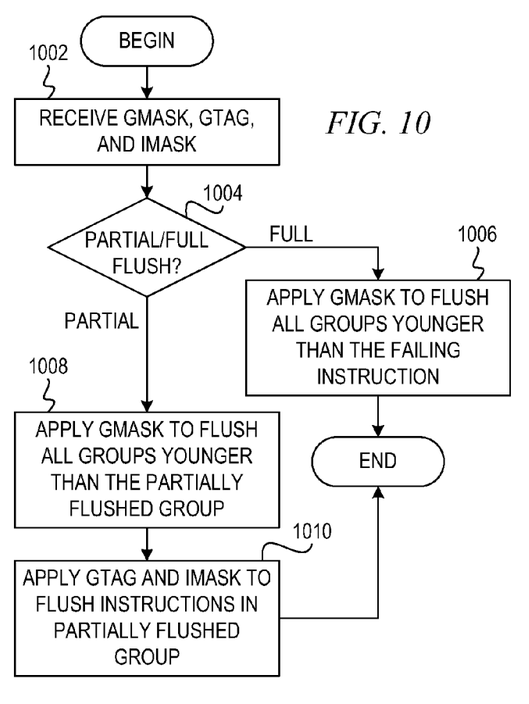
FIG. 10 is a flowchart illustrating operation of an execution unit for performing a partial group flush in accordance with an illustrative embodiment.

FIG. 10 is a flowchart illustrating operation of an execution unit for performing a partial group flush in accordance with an illustrative embodiment. Operation begins when a flush condition exists, and the execution unit receives a gmask, the gtag of the group with the flushing instruction, and imask (block 1002). Using the imask, the execution unit determines whether the flush is a full group flush or a partial group flush (block 1004). If the flush is a full group flush, the execution unit applies the gmask to flush all groups younger than the failing instruction (block 1006). In this case the gtag and imask have no effect. Thereafter, operation ends.

If the flush is a partial group flush in block 1004, then the execution unit applies the gmask to flush all groups younger than the partially flushed group (block 1008). The execution unit then applies the gtag and imask to flush instruction in the partially flushed group (block 1010). Thereafter, operation ends.

Thus, the illustrative embodiments provide mechanisms for partial flush handling with multiple branches per instruction group. The instruction fetch unit sorts instructions into groups. In accordance with the illustrative embodiments, a group may include a floating branch instruction and a boundary branch instruction. For each group of instructions, the instruction sequencing unit creates an entry in a global completion table (GCT), which may also be referred to herein as a group completion table. The instruction sequencing unit uses the GCT to manage completion of instructions within each outstanding group. Because each group may include up to two branches, the instruction sequencing unit may dispatch instructions beyond the first branch, i.e. the floating branch. Therefore, if the floating branch results in a misprediction, the processor performs a partial flush of that group, as well as a flush of every group younger than that group.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for partial flush handling, the method comprising:

dispatching an instruction group to one or more execution units, wherein the dispatched instruction group includes a plurality of instructions including a floating branch instruction;

responsive to the floating branch instruction resulting in a branch misprediction, sending flush information to the one or more execution units, wherein responsive to the flush information, the one or more execution units flush any full instruction groups younger than the dispatched instruction group and any instructions within the dispatched instruction group that are younger than the floating branch instruction, without flushing any instructions within the dispatched instruction group that are older than the floating branch instruction, such that the one or more execution units perform a partial flush of the dispatched instruction group; and creating an entry in a group completion table for the dispatched instruction group, wherein the entry comprises a group tag of the dispatched instruction group to identify the dispatched instruction group, an effective address tag of a first instruction in the dispatched instruction group to identify the first instruction in the dispatched instruction group, and an effective address tag of an instruction after the floating branch instruction to identify the instruction after the floating branch instruction to be speculatively executed.

2. The method of claim 1, wherein the entry further comprises a partial flush bit, the method further comprising:
responsive to the floating branch instruction resulting in a branch misprediction, setting the partial flush bit in the group completion table.

3. The method of claim 1, wherein the entry further comprises a set of finish bits, the method further comprising:
responsive to a given instruction within the dispatched instruction group completing, setting a bit in the set of finish bits corresponding to the given instruction.

4. The method of claim 3, further comprising:
responsive to all of the finish bits for the dispatched instruction group being set, determining that the dispatched instruction group has completed execution.

5. The method of claim 1, wherein the dispatched instruction group includes a boundary branch instruction such that the dispatched instruction group includes two branch instructions.

6. The method of claim 1, wherein dispatching comprises providing, for a given instruction within the dispatched instruction group, a group tag identifying the dispatched instruction group and an instruction tag identifying a relative age of the given instruction within the dispatched instruction group.

7. A method in a data processing system, for partial flush handling, the method comprising:
dispatching an instruction group to one or more execution units, wherein the dispatched instruction group includes a plurality of instructions including a floating branch instruction; and
responsive to the floating branch instruction resulting in a branch misprediction, sending flush information to the one or more execution units, wherein responsive to the flush information, the one or more execution units flush any full instruction groups younger than the dispatched instruction group and any instructions within the dispatched instruction group that are younger than the floating branch instruction, without flushing any instructions within the dispatched instruction group that are older than the floating branch instruction, such that the one or more execution units perform a partial flush of the dispatched instruction group,
wherein the flush information comprises a group tag of the dispatched instruction group to be partially flushed, a group mask that indicates which instruction groups are to be fully flushed, and an instruction mask that indicates which instructions in the dispatched instruction group are to be flushed.

8. The method of claim 7, wherein responsive to a given execution unit within the one or more execution units receiving the flush information, the given execution unit applies the group mask to flush all groups younger than the dispatched instruction group and applies the group tag and instruction mask to flush instructions within the dispatched instruction group.

9. A processor, comprising:
an instruction fetch unit;
an instruction sequencing unit; and
one or more execution units,
wherein the instruction fetch unit fetches a plurality of instructions including a floating branch instruction and sorts the plurality of instructions into an instruction group;
wherein the instruction sequencing unit receives the instruction group, creates an entry for the instruction group in a group completion table, and dispatches the instruction group to the one or more execution units;
wherein responsive to the floating branch instruction resulting in a branch misprediction, the instruction sequencing unit sends flush information to the one or more execution units and wherein responsive to the flush information, the one or more execution units flush any full instruction groups younger than the dispatched instruction group and any instructions within the dispatched instruction group that are younger than the floating branch instruction, without flushing any instructions within the dispatched instruction group that are older than the floating branch instruction, such that the one or more execution units perform a partial flush of the dispatched instruction group; and
wherein the instruction sequencing unit creates an entry in a group completion table for the dispatched instruction group, wherein the entry comprises a group tag of the dispatched instruction group to identify the dispatched instruction group, an effective address tag of a first instruction in the dispatched instruction group to identify the first instruction in the dispatched instruction group, and an effective address tag of an instruction after the floating branch instruction to identify the instruction after the floating branch instruction to be speculatively executed.

10. The processor of claim 9, wherein the entry further comprises a partial flush bit and wherein the instruction sequencing unit, responsive to the floating branch instruction resulting in a branch misprediction, sets the partial flush bit in the group completion table.

11. The processor of claim 9, wherein the entry further comprises a set of finish bits and wherein the instruction sequencing unit, responsive to a given instruction within the dispatched instruction group completing, sets a bit in the set of finish bits corresponding to the given instruction.

12. The processor of claim 11, wherein the instruction sequencing unit, responsive to all of the finish bits for the dispatched instruction group being set, determines that the dispatched instruction group has completed execution.

13. The processor of claim 9, wherein the dispatched instruction group includes a boundary branch instruction such that the dispatched instruction group includes two branch instructions.

14. The processor of claim 9, wherein the dispatching comprises providing, for a given instruction within the dispatched instruction group, a group tag identifying the dispatched instruction group and an instruction tag identifying a relative age of the given instruction within the dispatched instruction group.

15. A processor comprising:
an instruction fetch unit;
an instruction sequencing unit; and
one or more execution units,
wherein the instruction fetch unit fetches a plurality of instructions including a floating branch instruction and sorts the plurality of instructions into an instruction group;
wherein the instruction sequencing unit receives the instruction group, creates an entry for the instruction group in a group completion table, and dispatches the instruction group to the one or more execution units;
wherein responsive to the floating branch instruction resulting in a branch misprediction, the instruction sequencing unit sends flush information to the one or more execution units and wherein responsive to the flush information, the one or more execution units flush any full instruction groups younger than the dispatched instruction group and any instructions within the dispatched instruction group that are younger than the floating branch instruction, without flushing any instructions within the dispatched instruction group that are older than the floating branch instruction, such that the one or more execution units perform a partial flush of the dispatched instruction group, wherein the flush information comprises a group tag of the dispatched instruction group to be partially flushed, a group mask that indicates which instruction groups are to be fully flushed, and an instruction mask that indicates which instructions in the dispatched instruction group are to be flushed.

16. The processor of claim 15, wherein responsive to a given execution unit within the one or more execution units receiving the flush information, the given execution unit applies the group mask to flush all groups younger than the dispatched instruction group and applies the group tag and instruction mask to flush instructions within the dispatched instruction group.

* * * * *